Aug. 17, 1937.   N. J. SEIBERT ET AL   2,090,269
METER REGISTER
Filed Nov. 3, 1932   3 Sheets-Sheet 1
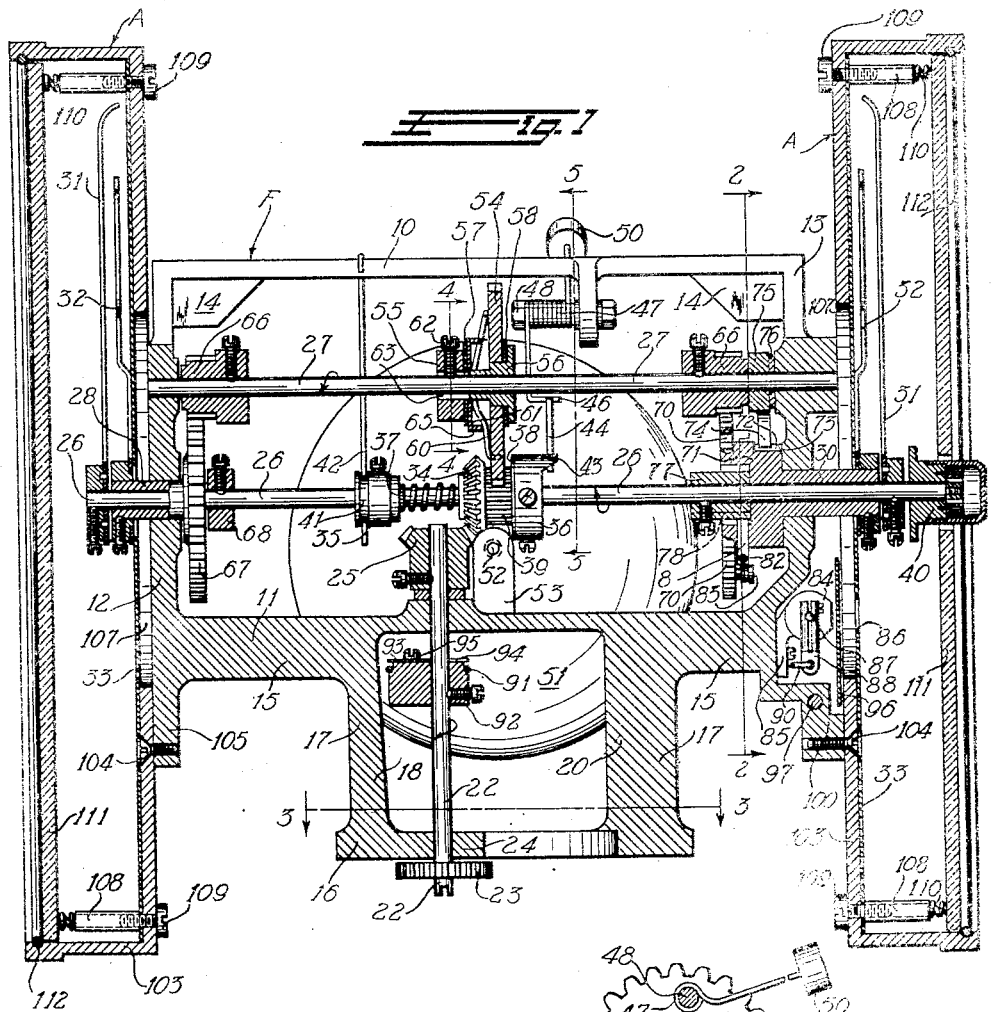
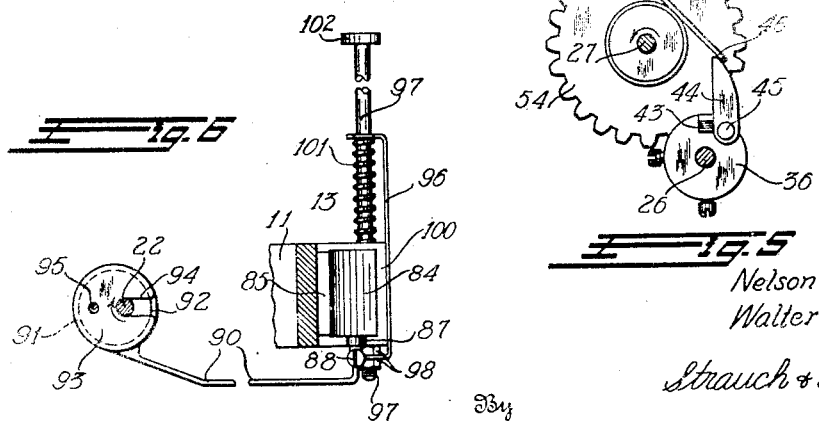
Inventor
Nelson J. Seibert
Walter H. Parker
Strauch & Hoffman
Attorneys Aug. 17, 1937.    N. J. SEIBERT ET AL    2,090,269
METER REGISTER
Filed Nov. 3, 1932    3 Sheets-Sheet 2

Inventor
Nelson J. Seibert
Walter H. Parker
Strauch & Hoffman
By
Attorneys

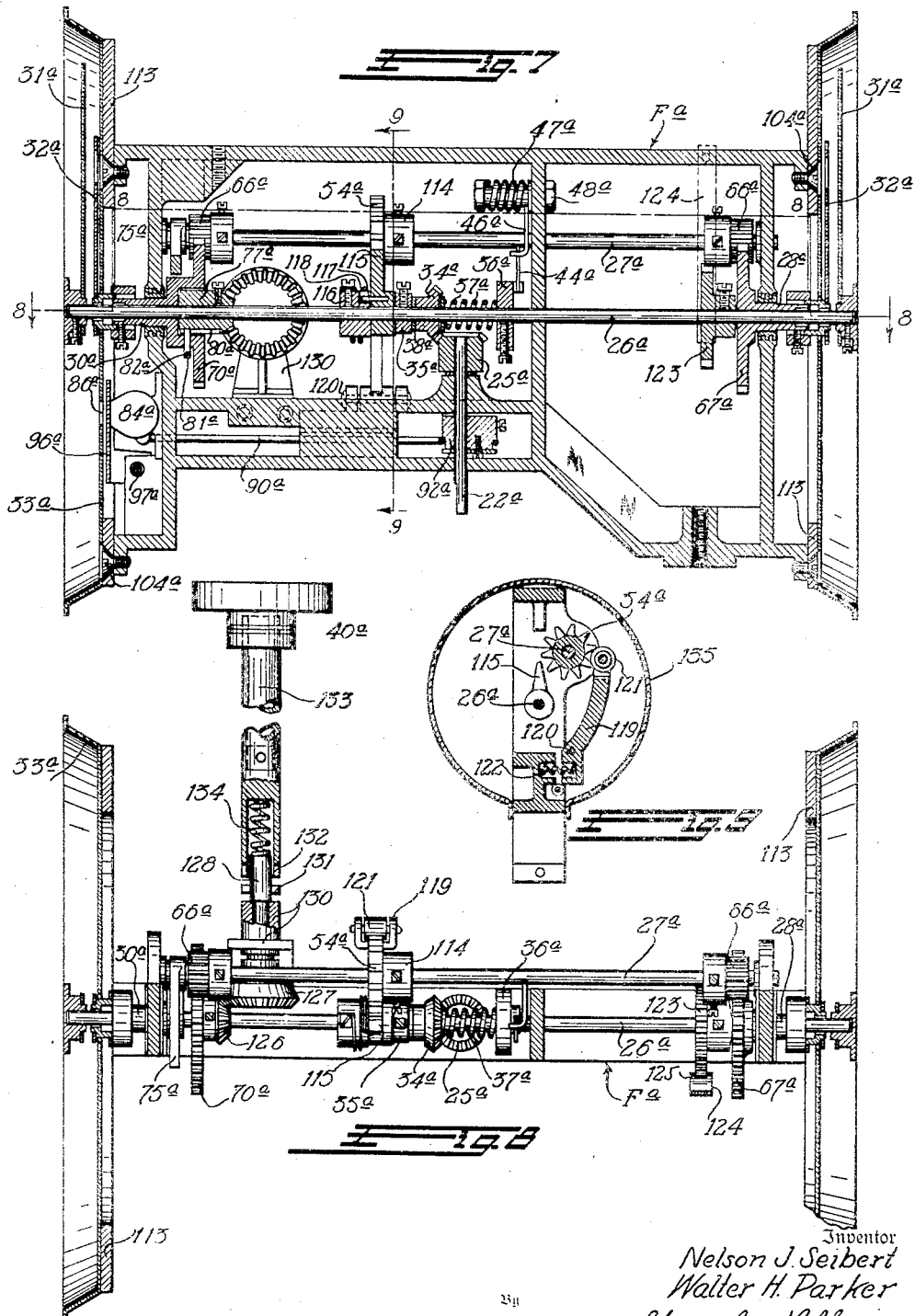

Patented Aug. 17, 1937

2,090,269

UNITED STATES PATENT OFFICE 2,090,269

METER REGISTER

Nelson J. Seibert, Wilkinsburg, and Walter H. Parker, Pittsburgh, Pa., assignors to Pittsburgh Equitable Meter Company, Pittsburgh, Pa., a corporation of Pennsylvania Application November 3, 1932, Serial No. 641,098

1 Claim. (Cl. 235—94)

This invention relates to registering apparatus especially designed for association with fluid meters for measuring out gasoline or the like. The invention is particularly concerned with registers of the type comprising a framework designed to be mounted on a meter and to support one or more dials, a drive shaft, one or more indicating shafts, gearing and resetting mechanism and possibly a bell and a counter.

The primary object of this invention is to provide a relatively inexpensive but sturdy and efficient register, in which the parts are simplified and assembled with great compactness and accuracy.

It is an object of the present invention to devise a light one-piece frame for compactly supporting one or more dial assemblies and all of the shafts, gears and other parts of the register. Heretofore the register frameworks have been made up in a series of parts in which accuracy of relative disposition of parts was difficult to secure, and when once such a frame structure was taken apart it was difficult to reassemble the parts properly.

In accordance with the present invention, the frame is in one piece, preferably die cast, and yet simple, rugged and inexpensive. Very little machine work is required, the frame itself may provide bearings. Accurate relationship of parts is assured.

Another object is to so design a frame with relation to an apertured dial that means is provided for conveniently and compactly mounting a counter and shutter directly behind the aperture of the dial.

A further object of this invention resides in the provision of register features which protect the purchaser against cheating. Such features include one-way resetting mechanism, means for preventing resetting of the indicating shafts beyond zero position and a counter-operating device which increases the counter total regardless of whether the meter shaft is rotated forwardly or reversely.

Another object of the present invention consists in devising a double-faced register wherein a pair of sturdy dial assemblies are supported in alignment by a frame with their peripheries extending beyond the outermost parts of the frame and its supported operating mechanism, whereby the latter is compactly disposed and protected during handling of the register.

Further major objects of this invention are to provide new and improved operating mechanisms, and to devise novel improvements in resetting features for use in these and other operating mechanisms.

Other objects are to provide improved dial assemblies and mountings, bell ringers and means for definitely correlating the moving parts to prevent overrunning and backlash.

These and further objects of the invention will fully appear upon a study of the following detailed description taken in conjunction with the accompanying drawings, wherein:

Figure 1 represents a vertical longitudinal section taken through a preferred embodiment of the invention substantially on the planes of the irregular line 1—1 in Figure 2.

Figure 5 is a detail view of the bell ringing mechanism as seen when looking upon the plane of line 5—5 in Figure 1.

Figure 6 is a further detail view showing, in plan, the counter and shutter mechanisms.

Figure 7 is a sectional view similar to Figure 1 but disclosing a modified form of register.

Figure 8 represents a longitudinal section taken upon the irregular line 8—8 in Figure 7, with parts of the mechanism shown in plan.

Figure 9 is a detailed cross-sectional view, drawn to reduced scale, on the plane of line 9—9 in Figure 7.

Figure 2:
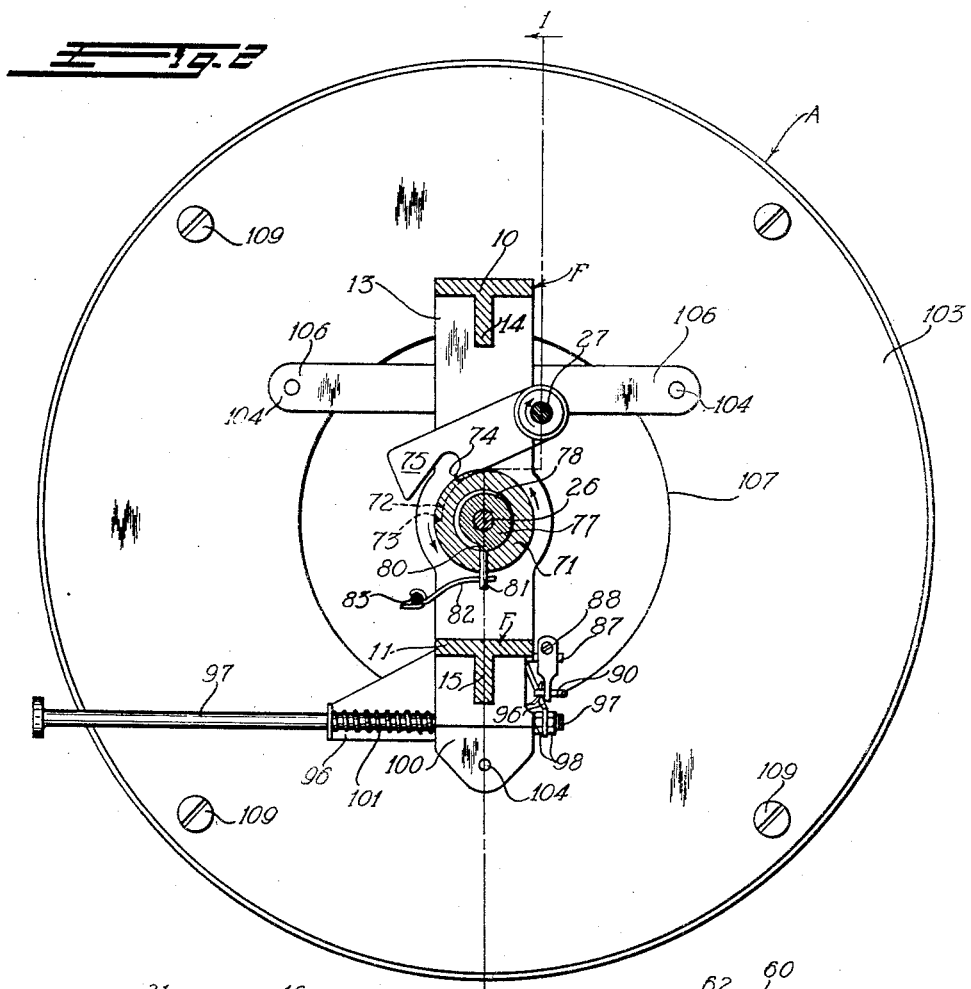
Figure 2 is a vertical cross-sectional view taken on the planes of irregular line 2—2 in Figure 1.
Figure 3:
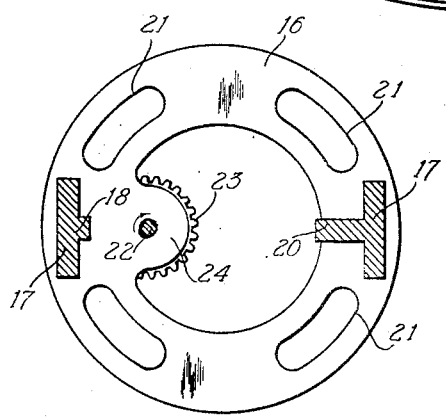
Figure 3 is a horizontal sectional view taken on the line 3—3 in Figure 1.

With continued reference to the drawings, wherein like characters are employed to designate like parts, and with particular reference for the moment to Figures 1 to 3, the complete framework of the register comprises a pair of sturdy dial assemblies A carried at opposite ends of an open one-piece frame F.

The frame F, which preferably is die cast as a unit, takes the shape of a light rectangular portion consisting of sides 10, 11 and ends 12, 13, reenforced by integral ribs 14 and 15; and an integral seating ring 16 which is united with the side 11 by legs 17 which have strengthening ribs 18, 20. As can be seen by reference to Figures 2 and 3, the frame is relatively light, being rather narrow transversely.

The ring 16 is designed to seat upon and be secured to a fluid meter (not shown), and to this end the ring has arcuate slots 21 through which connecting bolts may be passed. The slots are of sufficient length to permit convenient rotational adjustment of the register relative to the meter, upon loosening the bolts.

A primary drive shaft 22 designed to be connected to the driven shaft of the meter by a gear 23, is journaled vertically in an ear 24 formed on the ring and in a portion of the frame side 11. The upper end of the shaft has secured thereon a mitre gear 25 which, together with most of the other movable parts of the mechanism, is disposed within the open rectangular portion of the frame for convenient inspection, adjustment and repair.

A pair of spaced parallel shafts 26 and 27, hereinafter designated respectively as the unit and counter shafts, are mounted in parallelism within the rectangular frame with their ends supported by the latter. The ends of shaft 27 are directly journaled in the frame ends 12 and 13, but the ends of shaft 26 are journaled through sleeve members 28 and 30 respectively, which in turn are journaled in the frame ends,—this arrangement permitting rotation of the shaft and sleeves at different speeds, as is necessary because the ends of the shaft 26 carry fast moving unit pointers 31 whereas the sleeves carry slow moving totalizing pointers 32. For example, in dispensing gasoline by the gallon, the unit pointers indicate fractional units on the dials 33 and the totalizing pointers move from one unit marking on the dial scale to another during each complete rotation of the unit shaft. The scales of course may be divided into any convenient number of units provided that the gearing (about to be described) is properly correlated with such division.

The unit shaft 26 is driven at equal speed with the primary shaft 22 by means of a mitre gear 34 which is in mesh with the gear 25. The gear 34 is slidably carried on the shaft 26 between a pair of collars 35 and 36, which are locked to the shaft, and is urged toward the collar 36 by means of a coil spring 37. A friction washer 38 is disposed between the collar 36 and a toothed hub 39 formed integral with the gear 34; and the compression of the spring is such as to frictionally hold the gear, washer and collar together for unitary rotation when the meter is operating, but such as to permit the gear to remain stationary, by slipping, when the shaft 26 is reversely operated, as by a control knob 40, during the pointer-resetting operation.

The one-way type of reset knob seen in Figure 1 forms no part of the present invention. It is disclosed and claimed in Patent No. 1,870,155, granted August 2nd, 1932.

The collars 35 and 36, above mentioned, serve additional functions. The former has a peripheral groove 41 in frictional engagement with a wire or leaf spring 42 so as to prevent overrunning and backlash in the gearing. The collar 36 operates a bell ringer, as follows.

A lug 43 is formed integral with the collar 36 and adjacent a finger 44 which is pivoted on the collar at 45, (see Figures 1 and 5). The relationship is such that when the collar is rotating in registering direction the finger will be held vertically once during each rotation so that its tip will lift and then release one end 46 of a bell ringer. The latter further comprises a coil spring 47 pivoted on a frame-supported pin 48 and having a clapper 50 secured on its other free end for cooperation with a cup-shaped bell 51 which is centrally secured at 52 to a frame extension 53. However, when the shaft 26 is reversely rotated during the subsequent resetting operation, the finger 44 merely drops, under the action of gravity, against the shaft 26 when it approaches the spring end 46 and hence makes no bell-ringing engagement with the latter.

The clapper 50 normally is spaced above the bell by virtue of abutting relationship between the spring end 46 and the shaft 27. The coiled portion of the spring 47 ensures that the momentum of the clapper as it falls will carry it into forceful but very brief contact with the bell.

Figure 4:
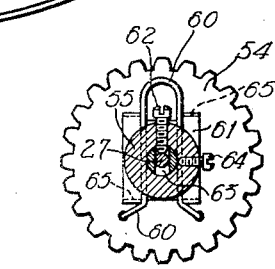
Figure 4 is another detailed sectional view, taken on the plane of line 4—4 in Figure 1.

The totalizing pointer sleeves 28 and 30 are driven through the gear 34 by way of the upper shaft or countershaft 27. The hub 39 of gear 34 meshes with a large spur gear 54 which is frictionally mounted on the shaft 27 by means of a slipping clutch assembly comprising a collar 55, bushing 56, washers 57 and 58, wire spring 60 and special plate 61. The collar and bushing are united to the shaft 27,—the former by means of a set screw 62 which extends through a slot 63 in the bushing (see Figure 4) into engagement with the shaft, and the latter by means of a set screw 64 which passes through the collar into engagement with the bushing.

The hairpin spring 60 and plate 61, on the other hand, are secured to gear 54, the former by having its free ends hooked into the gear as shown, and the latter by virtue of its four offset fingers 65 which engage the outside edges of the spring legs. The gear is freely mounted on the bushing, but the hairpin spring is strong enough to thrust the gear and the plate 61 into engagement with the washers 58 and 57 respectively to develop sufficient friction to cause the gear and shaft to rotate as a unit when the register is operating in a dispensing direction. However, this frictional drive will yield and slip if the shaft is reversely actuated.

A pair of small pinions 66 are secured to the ends of the shaft 27. One of the pinions is in driving engagement with a spur gear 67, which forms an integral part of the sleeve member 28 and is positioned by contact with a collar 68 on the shaft 26. The entire sleeve member, including the gear, is freely journaled on the shaft 26 to permit rotation at lower speed than the latter.

The other pinion 66, is in mesh with a spur gear 70 which has an integral cup-shaped hub 71 forming a rigid part of the sleeve 30. The external surface of the hub 71 has a cam or ratchet groove 72 formed thereon to provide a stop 73 for engagement with a complemental stop member 74 formed on a gravity actuated pawl 75. The latter is pivoted on the shaft 27 between the pinion 66 and a washer 76. These stop elements do not come into play during rotation in a registering direction, but are so correlated with the totalizing pointers that the element 73 jams against the element 74 precisely when said pointers reach zero position during the resetting operation.

For the purpose of positively intercoupling the unit and totalizing shafts for rotation at the same speed when reset knob 40 is manipulated to return the pointers to zero, the following clutch mechanism is provided—(see Figures 1 and 2).

A collar 77, which is locked on the shaft 26 and loosely nested within the gear hub 71 to position the latter relative to the frame, has a cam or ratchet surface 78 resulting in the formation of a shoulder 80. A pin 81 is slidably fitted in a radial hole in the hub 71, and a spring 82 constantly urges this pin into contact with the cam surface 78. The spring consists of a flexed wire, which has one end projecting through a hole in the outer end of the pin 81 and its other end secured to a pin 83 that is rigidly carried by the gear wheel 70.

When the mechanism is operating in registering direction, as indicated by directional arrows in the drawings, the abutment 80 and pin 81 merely slide past each other, but when the unit shaft 26 is manually reversed the inner end of pin 81 will ultimately stop against the abutment 80. The point at which this clutching engagement occurs corresponds, as the result of proper correlation of parts, with that point at which the faster moving unit pointers reach positions in coincidence with those of the totalizing pointers. All of the pointers are then forced to travel together at the same speed toward the scale zero, beyond which the pawl 75 positively prevents them from moving.

The shafts 26 and 27 otherwise are uncoupled from each other and from the primary shaft 22 during the resetting operation, due to the slipping permitted by the frictional mountings, above described, between the gears 34, 54 and the shafts 26, 27 respectively.

A counting mechanism is driven from the primary shaft 22 so as not to be affected by those register motions which take place independently of the meter; and is connected to the said shaft in such manner that, even though this shaft 22 should be reversely rotated, the counter will still count forwardly and thus prevent the customer from being cheated. The counting mechanism comprises the following parts, (see Figures 1, 2 and 6).

A conventional small counter 84 is mounted by a bracket 85 in a recess of the frame with the open counter face adjacent the dial 33 and visible through an aperture 86 in the latter. The axial operating shaft 87 of the counter is gripped in the forked end of a crank 88 which is designed for oscillation to and fro by one end of an eccentric strap 90. The strap 90 is in the form of a wire having its other end forming a ring 91 which fits upon a grooved portion of a collar 92 that is eccentrically locked upon the shaft 22. The ring is maintained in position by a plate 93, which is slotted at 94 for reception of the shaft and provided with a securing screw 95.

The above arrangement provides for compact disposition of the counting mechanism substantially within the lateral bounding planes of the rectangular frame portion, and ensures that the counter will be positively operated regardless of the direction of rotation of the shaft 22.

The indicating face of the counter 84 normally is concealed by a shutter plate 96 which is fastened to an actuating pin 97 by nuts 98. The pin slides through an angular framework leg 100 and has its nutted end constantly urged toward one side of said leg by a coil spring 101 which reacts between the other side of the leg and a portion of the shutter plate. The shutter may be shifted by pushing axially upon the head 102 of the pin to overcome the spring resistance.

The dial assemblies A comprise, in addition to the described circular dials 33, a pair of sturdy pan-shaped members 103. These members are secured to the frame A by screws 104, for which purpose the frame includes, in addition to the leg 100 already described, an opposite leg 105 and two sets of integral cross-arms 106 (see Figure 2). The central portions of the pans are open as at 107, for decreasing weight and adding to manufacturing and assembling advantages.

The dials 33 are held against the pan bottoms by sleeves 108 into which screws 109 are threaded from the rear sides of the pans. Small coil springs 110 are fitted in the outer ends of these sleeves so as to yieldingly urge the glass closure plates 111 into chatter-proof engagement with the bezel or snap rings 112 which complete the dial assemblies. One of the glass plates is apertured as shown to place the reset knob 40 in position for convenient external manipulation.

It should be observed that the sturdy pans 103 are of sufficient diameter to extend beyond the outermost radial limits of the compact structure mounted between them, and that they thus help to protect the operating mechanism, especially during handling and packing. The complete register may roll on the floor without bumping any of the mechanism except the yielding pin 97 which, incidentally, thus checks any accidental rolling movement.

In Figures 7 to 9 there is illustrated a modified form of register embodying totalizing sleeves operated with a "jump" motion, as contrasted with the continuous uniform motion imparted to the sleeves of the register just described; and further embodying a laterally operable reset device instead of one which is operable from the rear face. Other differences will appear as the description proceeds, in which description those parts, which correspond to but differ slightly from similar parts of the preceding register, will be given the same reference characters with the suffix "a" added thereto. Substantially the same bell ringing, counting and shutter mechanisms are utilized in both forms, and hence no further discussion of these features need be given.

The modified framework, Fa, preferably die cast in one piece, is relatively light and narrow and forms bearings and other types of supports for compactly mounting all of the parts in readily accessible positions. The dials 33a are in the form of thin pans carried in any suitable manner by sturdy rings 113 which in turn are secured on the ends of the frame by screws 104a.

Parallel unit and counter-shafts, 26a and 27a respectively, are journaled lengthwise of the frame, with the ends of shaft 26a projecting through sleeve members 28a and 30a which carry the totalizing pointers 32a. These sleeve members include integral gears 67a and 70a in mesh with pinions 66a that are secured to the ends of the upper shaft 27a.

The primary shaft 22a and its mitre gear 25a drive a mitre gear 34a which is frictionally coupled to the unit shaft by means of a pair of collars 35a, 36a, washer 38a and coil spring 37a. The collars are rigidly secured to the shaft 26a and the spring urges the gear 34a against the washer with sufficient force to establish a frictional drive in registering direction. The shaft and collars of course turn independently of the gear 34a during the resetting operation.

The shaft 27a is driven intermittently from the shaft 26a, by means of a star wheel 54a which is secured to the former by an integral collar 114 and which is actuated by a finger 115 that is designed to rotate with the shaft 26a. The number of teeth on the star wheel determines the number of equal units into which the circular scales are to be divided, since at the completion of each registering rotation of the shaft 26a the finger 115 engages one tooth of the star wheel and causes the shaft 27a to "jump" through a fraction (one-tenth as illustrated) of a complete rotation.

The finger 115 may be directly fixed upon its shaft by a set screw but preferably is journaled thereon and driven thereby through a fixed collar 116 and a pin 117. The pin has one end fitted in the finger and its other end relatively loosely projected into a slot 118 in the collar and is resiliently held in advanced position by a spring 117' which has one end hooked over the finger 115 and the other end over the set screw in the collar 116,—the purpose of this arrangement being to give the finger a slight resilient play relative to the shaft 26a to provide insurance against improper or binding co-action between the finger tip and the star wheel teeth, and to perfect the functioning of a yieldable positioning device now to be described.

The positioning device comprises an arm 119 pivoted on the frame at 120, a roller 121 rotatably carried in one end of the arm and a spring 122 under compression between the frame and the other end of the arm in such manner as to urge the roller laterally into a pocket formed by a pair of star wheel teeth. The roller yields outwardly and successively rides over the individual teeth upon successive rotations of the finger 115. The finger initiates each step of the star wheel rotation, after which the roller then completes the step with a snap or jump action and thereafter holds the wheel in proper position to obtain an accurate setting of the totalizing pointers in perfect coincidence with the scale unit markings. The roller device further prevents overrunning of the shaft 27a when the finger strikes and passes a star wheel tooth.

The shaft 26a may be steadied by a toothed wheel 123 secured thereon and designed to engage the curved hump 125 of a flat spring 124, one end of which is secured to the frame in such manner as to yieldingly urge the curved end into the tooth spaces of the wheel.

The mechanism of the register of Figures 7 to 9 may be manually reset as in the first form described, or by the following arrangement (which in turn may be applied to the first form if desired):

The clutch collar 77a has bevel teeth 126 in mesh with a bevel gear 127 that is secured on a short shaft 128, the latter being journaled in a frame-supported bracket 130. The shaft 128 projects laterally from the register and at its outer end is provided with clutch dogs 131 designed to enter corresponding slots 132 provided in one end of an actuating stem 133 (Figure 8). The stem 133 is supported for rotation and for longitudinal sliding movement in any suitable manner, and normally is urged outwardly by a coil spring 134 so as to disengage the clutching elements 131 and 132 and thus prevent excessive loading on the driven shaft 26a during registering operation. This normal disengagement has the further advantage of preventing tampering by those who do not know the construction of the concealed mechanism.

For manual actuation the stem 133 has a knob 40a which may be coupled positively thereto or which, if desired, may take the one-way clutch form of the knob 40. By depressing the knob and then turning it in proper direction, the register mechanism may be set quickly to zero position, during which operation the clutch parts 80a, 81a and 82a function as in the first embodiment described, and the frictional driving connection between the shaft 26a and gear 34a permits the latter to slip. No frictional slipping feature is necessary in association with the gear 54a, due to the fact that the single tooth (finger 115) cannot engage the gear teeth prior to the time that the pointers reach zero from any position on the dials.

As seen in Figure 9, a light sleeve-like casing 135 may be fitted around the narrow frame and its supported parts for purposes of protection and appearance.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:—

A registering apparatus comprising a supporting frame, a drive shaft journaled in said frame, a unit shaft, a countershaft journaled in said frame, a gear on said unit shaft comprising a spur section, a gear on said drive shaft meshing with said gear on said unit shaft, a spur gear on said countershaft meshing with said spur section, a totalizing sleeve journaled in said frame and rotatably supporting said unit shaft adjacent its end, a gear carried by said sleeve, a second gear fixed to said countershaft and meshing with said last named gear, indicators carried by said unit shaft and said sleeve, and friction drive connections between said unit shaft and the gear thereon and between said countershaft and the spur gear thereon, said friction drive connections being of sufficient strength to transmit rotary registering motion to said unit shaft and said countershaft but adapted to slip and permit reverse rotation of said countershaft and said unit shaft without rotating said drive shaft.

NELSON J. SEIBERT.
WALTER H. PARKER.